US006811032B2

(12) United States Patent
Schulte, Jr. et al.

(10) Patent No.: US 6,811,032 B2
(45) Date of Patent: Nov. 2, 2004

(54) SHAKER ROLL SCREEN

(75) Inventors: David L. Schulte, Jr., Broussard, LA (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 63 days.

(21) Appl. No.: 10/345,878

(22) Filed: Jan. 16, 2003

(65) Prior Publication Data

US 2004/0140249 A1 Jul. 22, 2004

(51) Int. Cl.$^7$ ................................................ B07C 1/10
(52) U.S. Cl. ...................... 209/307; 209/391; 209/319; 209/401
(58) Field of Search ................................. 209/307, 309, 209/319, 391, 392, 394, 395, 396, 397, 398, 399, 401, 402, 403; 242/357; 210/359

(56) References Cited

U.S. PATENT DOCUMENTS

| | | | | |
|---|---|---|---|---|
| 2,104,785 | A | | 11/1938 | Akeyson .................... 210/384 |
| 2,576,283 | A | | 11/1951 | Chaney |
| 2,867,326 | A | * | 1/1959 | Gene ......................... 210/104 |
| 3,520,753 | A | * | 7/1970 | Ryan et al. ................. 156/246 |
| 3,722,682 | A | * | 3/1973 | Pistiner ...................... 210/123 |
| 3,731,808 | A | * | 5/1973 | Rickert ...................... 210/138 |
| 3,741,389 | A | * | 6/1973 | Anderson ................... 210/783 |
| 3,780,863 | A | * | 12/1973 | Light .......................... 210/97 |
| 3,901,809 | A | * | 8/1975 | Ball et al. ................... 210/387 |
| 4,582,602 | A | * | 4/1986 | Cardoza et al. ............ 210/230 |
| 4,809,791 | A | | 3/1989 | Hayatdavoudi ............. 125/40 |
| 4,948,502 | A | * | 8/1990 | Anderson ................... 210/387 |
| 5,008,007 | A | * | 4/1991 | Anderson ................... 210/111 |
| 5,248,043 | A | | 9/1993 | Dorn ........................... 209/399 |
| 5,433,851 | A | * | 7/1995 | Itoh ............................ 210/386 |
| 5,921,399 | A | | 7/1999 | Bakula et al. ............... 209/272 |
| 6,024,228 | A | | 2/2000 | Williams .................... 209/272 |
| 6,105,785 | A | | 8/2000 | Williams .................... 209/307 |
| 6,155,428 | A | | 12/2000 | Bailey et al. ............... 209/315 |
| 6,241,900 | B1 | * | 6/2001 | Nakamura et al. .......... 210/769 |
| 6,244,362 | B1 | | 6/2001 | Williams .................... 175/206 |
| 6,250,476 | B1 | | 6/2001 | Kroon et al. ................ 209/272 |
| 6,273,270 | B1 | * | 8/2001 | Nakamura et al. .......... 210/386 |
| 6,543,621 | B2 | | 4/2003 | Baltzer et al. .............. 209/405 |

OTHER PUBLICATIONS

Gumbo Removel Equipment, Brandt, 4 pp. 1998.
Products & Services, EFE Environmental & Filtration Equip. Co., 1 pp. 2000.
Metal Belts For In Process Conveying, Screen Systems Limited, 2000.

* cited by examiner

*Primary Examiner*—Donald P. Walsh
*Assistant Examiner*—Jonathan R Miller
(74) *Attorney, Agent, or Firm*—Guy McClung

(57) ABSTRACT

A shale shaker or vibratory separator for treating material, e.g. in one aspect, a shale shaker for treating drilling fluid having contaminants therein, the shale shaker having a base, a basket on the base, fluid introduction apparatus for introducing the drilling fluid into the basket, screen apparatus for selectively providing screening material in or under the basket, the screening material positioned so that the drilling fluid flows onto the screening material, a primary roll of screening material, a take-up roll for receiving screening material from the primary roll, the rolls rotatably mounted so that screening material is movable, through or under the basket, and onto the take-up roll, vibratory apparatus connected to the basket for vibrating the basket, and receptacle apparatus for receiving fluid flowing through the screening material.

20 Claims, 4 Drawing Sheets

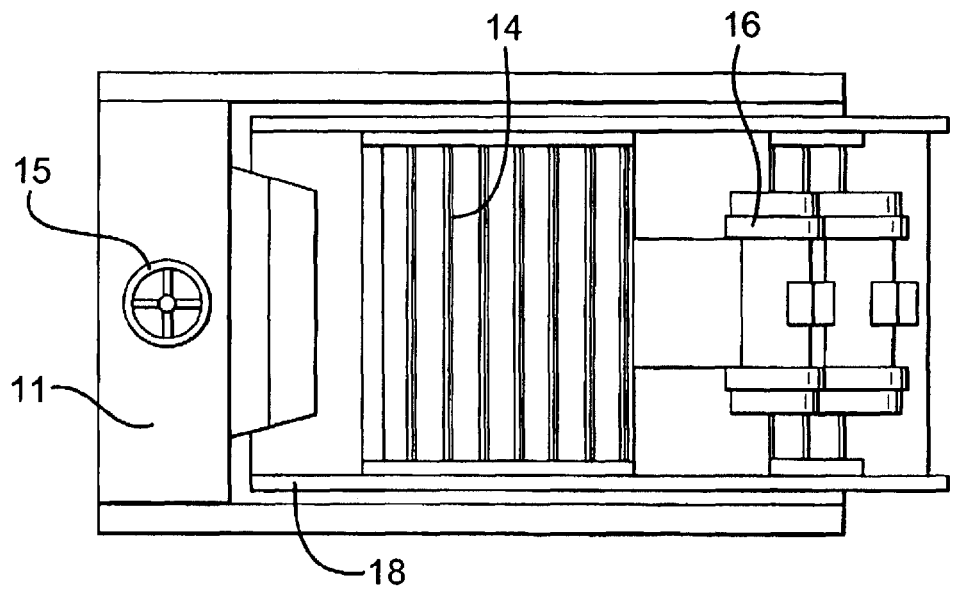
*Fig. 1C*
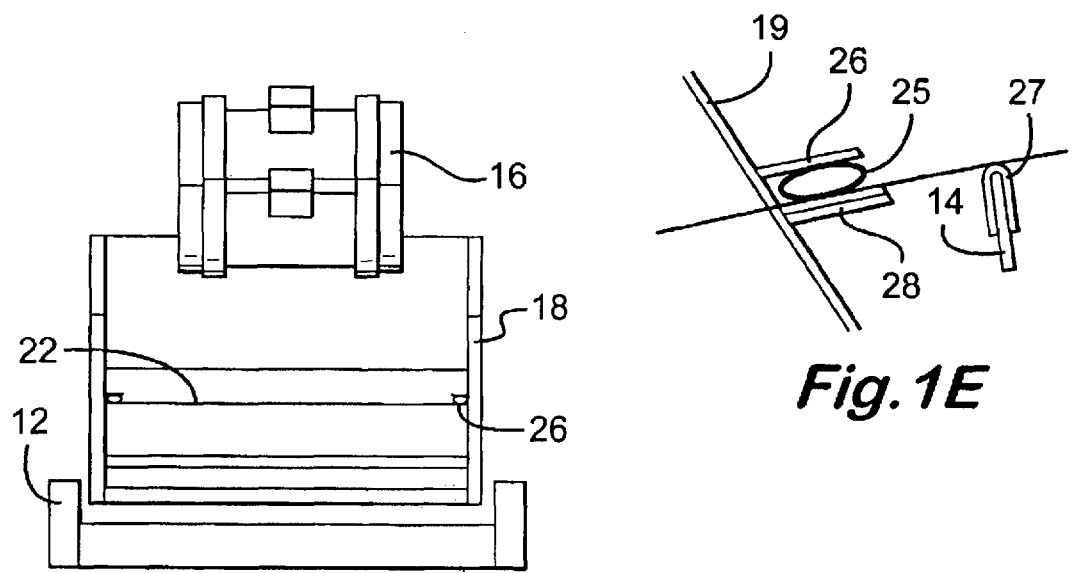
*Fig. 1D*
*Fig. 1E*
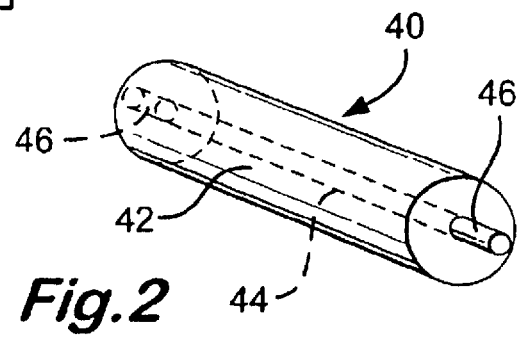
*Fig. 2*

SHAKER ROLL SCREEN

BACKGROUND OF THE INVENTION

1. Field of the Invention

The present invention is directed to screen apparatus for a vibratory separator and, in one particular aspect to roll screen apparatus for treating drilling fluid in a shale shaker.

2. Description of Related Art

A variety of prior art vibratory separators and shale shakers have one or more screen assemblies that are removably mounted to screen holding structures or mounts in the separator or shaker. When a screen assembly is worn or damaged, the separator or shaker is turned off, the screen assembly is released from its mounting structure, and it is then removed from the separator or shaker. This is a time-consuming, labor-intensive operation which can result in significant down-time for drilling or other wellbore operations.

There has long been a need, recognized by the present inventors, for a fast and efficient way to replace screen assemblies in a vibratory separator or shale shaker. There has long been a need, recognized by the present inventors, for a way to change out a screen assembly without shutting down a wellbore operation which employs the separator or shaker.

SUMMARY OF THE PRESENT INVENTION

The present invention, in certain aspects, provides a vibratory separator or a shale shaker which has a rotatable roll of screening material mounted to one end of a basket, frame or base so that the screening material can be unrolled selectively or automatically within or under a basket, screen mount, or screen container. A take-up roll mounted at an opposite end of the frame rotates to take up used screening material. Tension on the screening material is provided by one or both rolls and/or by other tensioning apparatus, e.g., but not limited to, one or more inflatable apparatuses or bladders, or hydraulic ram tensioners.

In another aspect, a roll of screening material and a take-up roll are mounted on opposing sides of a frame and screening material moves from one side to the other side of the frame as the rolls rotate. It is within the scope of this invention to have one, two, three or more such sets of rolls on a single frame. Also, such a set of rolls can be positioned on the frame to provide screening material over part of or substantially all of the entire surface area of a basket or frame or at any desired location, including, but not limited to, at a fluid-introduction area of the separator or shaker (e.g. adjacent to a "possum belly" of a shale shaker).

The screening material on a roll may be single or multilayer and may, with multiple layers, be bonded, glued, sintered, epoxied, sewn or otherwise connected together. In certain aspects one or more glue or adhesive strips are provided along the length of the screening material to enhance sealing of a screening-material/mount-surface interface. In other aspects one, two or more beads and/or strips of glue are positioned along or near edges of rolls of screening material to provide a contact surface for a screen clamping or holding mechanism and, in certain aspects, to provide structure that inhibits or prevents the propagation of a tear or cut in the screening material.

In one particular aspect, a roll of screening material is produced by a glue machine [e.g. as described in U.S. applications Ser. No. 09/454,722, filed Dec. 4, 1999; Ser. No. 09/517,212 filed Mar. 2, 2000; Ser. No. 10/087,025 filed Oct. 19, 2002; and Ser. No. 10/037,474 filed Oct. 29, 2001; and U.S. Pat. No. 6,450,345 issued Sep. 17, 2002 co-owned with the present invention and incorporated fully herein for all purposes] In other aspects a roll produced by a glue machine is the same roll used on a separator or shaker. As needed end caps, and/or adapters may be used for mounting a roll to a shaker.

In another aspect a screen roll apparatus according to the present invention is used in conjunction with existing screen assemblies in existing separators and shakers either above them (e.g. but not limited to as a scalping screen) or below them for further screening capability.

Roll cylinders according to the present invention may be made of plastic, fiberglass, cardboard, composite, metal, steel, stainless steel, and are, in certain aspects re-fillable and reusable.

In certain aspects a visual inspection is made of a separator or shaker with screen roll apparatus according to the present invention and the rolls are rotated when such a visual inspection reveals a worn or damaged area on the screen material. In another aspect the roll apparatus is automatically indexed and rotated at regular time intervals depending on the material being treated and/or on flow rates. In another aspect sensors sense a decrease in screen throughput and/or a damaged or worn screen area and interconnected movement apparatus rotates the rolls to position new screening material in the separator or shaker.

In certain embodiments different screening material sections are wound onto a single roll in anticipation of encountering different formations or geological materials in an on-going wellbore operation and/or in anticipation of using differing fluids for such operations.

It is, therefore, an object of at least certain preferred embodiments of the present invention to provide:

New, useful, unique, efficient, non-obvious systems and methods for providing new screening material for use within a vibratory separator or shale shaker;

Such systems and methods which provide new screening material while a vibratory separator or shale shaker continues to operate;

Such systems and methods with screening material having one or more seal strips thereon to enhance sealing of a screen/structure interface; and/or one or more edge strips thereon to inhibit or prevent tear propagation;

Such systems and methods which provide one or more sets of rolls with screening material (either with similar or different screening material) that moves either parallel to or transverse to a general direction of the flow of material in the separator or shaker;

Such systems and methods which are manually or automatically operable and which, in certain aspects, are activated by one or more sensors that sense worn or damaged screen;

Such systems and methods usable in conjunction with existing screen assemblies, separators, and shakers.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 1C is a top view of the shale shaker of FIG. 1A. FIG. 1D is an end view of the shale shaker of FIG. 1A. FIG. 1E is an enlargement of part of the shaker of FIG. 1A.

FIG. 2 is a perspective view of a roll for screening material for use on a shale shaker according to the present invention.

FIGS. 3B and 3C are side views of members according to the present invention that underlie screening material in a screen holding or mounting structure.

DESCRIPTION OF EMBODIMENTS PREFERRED AT THE TIME OF FILING FOR THIS PATENT

Figure 1A:
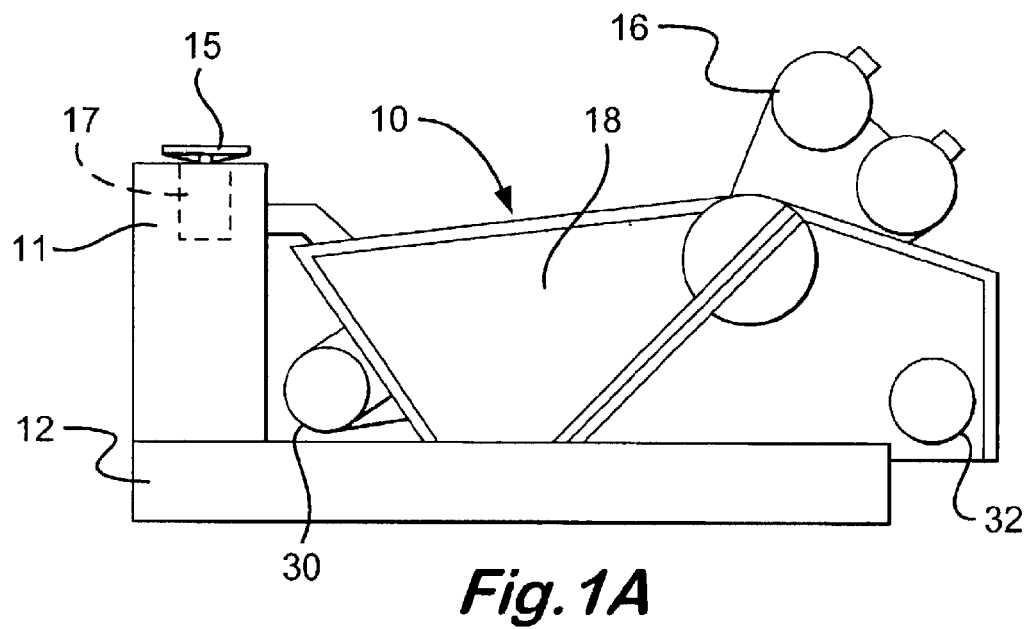
FIG. 1A is a side view of a shale shaker according to the present invention.
Figure 1B:
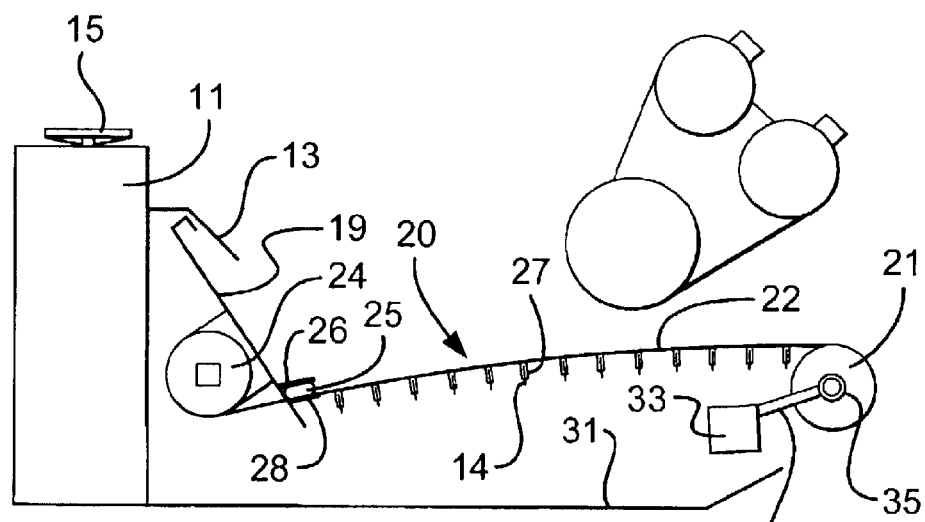
FIG. 1B is a cross-section view of the shale shaker of FIG. 1A.

FIGS. 1A–1D show a shale shaker 10 according to the present invention which has a base 12 with fluid introduction apparatus 11 from which fluid to be treated by the shale shaker is fed into a basket 18 onto screen apparatus 20. Cross members 14 with top rubber cushions 27 support screening material 22. The screening material 22 shown in FIG. 1B is deleted from FIG. 1C to expose the cross members 14. Vibratory apparatus 16 vibrates the basket 18. Valve apparatus 17 including a movable handle 15 provides selective control of fluid flow into the basket 18. Fluid passing through the screening material 22 flows to a collection receptacle 31.

Any known suitable vibratory apparatus, basket, base, fluid introduction apparatus (also called a "possum belly"), and valve apparatus may be used for the items bearing, respectively, numerals 16, 18, 12, 11 and 17; and the roll screen apparatuses according to the present invention described below may be incorporated into any known shale shaker that presently uses replaceable screen assemblies.

Fluid from the fluid introduction apparatus 11 flows onto an optional splash plate 13 and onto a rear plate 19 before flowing onto the screening material 22.

Screening material 22 is wound onto a primary roll 24 and passes between upper and lower supports 26 and under an inflatable bladder apparatus 25 (see enlargement, FIG. 1E).

Motor apparatus 33 drives belt or chain 34 which encircles appropriate gearing or sprocket 35 on the roll 21 to rotate the roll 21 and, in certain aspects, to provide tension on the screening material 22.

Used screening material 22 is taken up by a take-up roll 21. Roll mount apparatus 30, 32 is provided for installation and removal of the rolls 24, 21, respectively. Such rolls may have a central axle, end caps, and/or end knobs for mounting to roll mount apparatus. FIG. 2 shows a roll according to the present invention with a generally cylindrical body 42 and an axle 44 with protruding ends 46.

The vibratory apparatus 16 vibrates the basket and the screening material so that separated contaminants (e.g., but not limited to drilled cuttings, debris, and drill solids) move off an end of the basket adjacent the take-up roll 21.

Any suitable known screening material may be wound onto rolls for use with roll apparatus, separators, and shakers according to the present invention. In certain aspects, screening material as disclosed in the following U.S. applications and patent may be used (all incorporated fully herein for all purposes): U.S. applications Ser. No. 09/454,722, filed Dec. 4, 1999; Ser. No. 09/517,212 filed Mar. 2, 2000; Ser. No. 10/087,025 filed Oct. 19, 2002; and Ser. No. 10/037,474 filed Oct. 29, 2001; and U.S. Pat. No. 6,450,345 issued Sep. 17, 2002, and in the prior art cited therein.

Figure 3A:
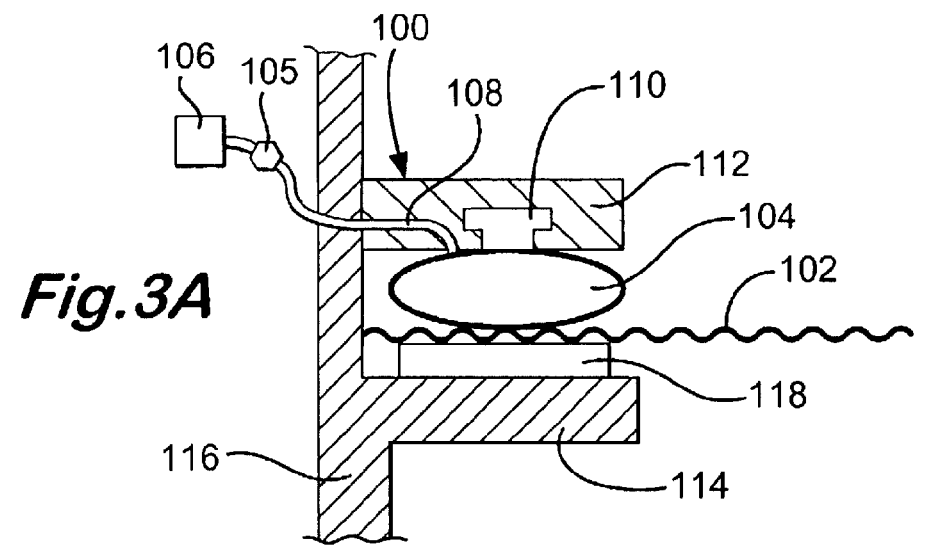
FIG. 3A is a side cross-section view of a screen clamp apparatus according to the present invention.
Figure 3D:
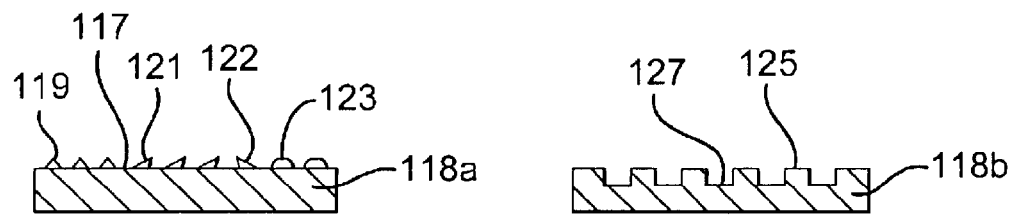
FIG. 3D is a side view in cross-section of a bladder for a screen clamp apparatus according to the present invention.
Figure 3D:
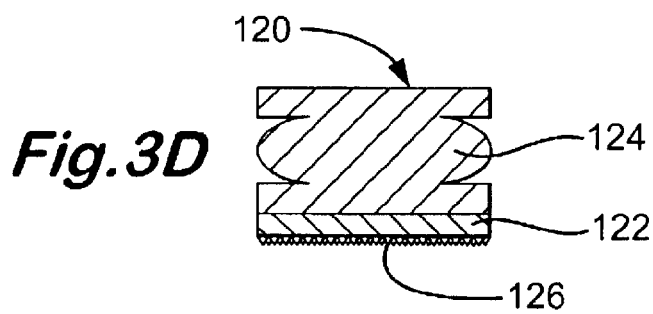

FIGS. 3A and 3B show a screen clamping apparatus 100 according to the present invention for holding screening material 102 within a basket of a shale shaker or other vibratory separator. The screening material 102 can be any screening material described or referred to herein that is positioned within a basket or other screen mounting device or apparatus.

The clamping apparatus 100 has a selectively inflatable bag or bladder 104 (shown inflated in FIG. 3A, made, e.g., of nitrile rubber or steel-reinforced nitrile rubber) which abuts and presses down on a top surface of the screening material 102 and/or contacts a glue bead or glue strip on the screening material 102. Any desired number of such apparatuses—on sides and/or ends of a basket, etc.—can be used to maintain a screen assembly in position in a basket or similar structure. Control apparatus 105 controls air flow in the line 108. Compressed air is supplied to (or evacuated from) the bladder 104 from a tank or reservoir 106 through the line 108. An upper part 110 connected to the bladder 104 is secured within a steel mounting member 112. The screening material 102 rests on side ledges or flanges 114 of a basket 116 (shown partially, like, e.g., the basket 18, FIG. 1A). A cushion 118 extends along the ledges 114 underneath and substantially coextensive with the bladder 114, although it is within the scope of this invention to use a plurality of spaced-apart cushions 118. Thus, the screening material 102 is clamped between the bladders 104 (made, e.g. of rubber or similar material) and the cushions 118. The cushions 118 may be made of any suitable cushion material, including, but not limited to, suitable plastic, elastomers and rubber. In alternative embodiment, the item 118 is not a cushion but serves as a wear strip and is made of suitable relatively hard material, e.g., but not limited to, fiberglass, metal, wood, composite, and plastic. The cushion or item 118 may have a surface with structure and/or material for increased holding ability to hold screening material on top of the cushion or item 118. FIGS. 3B and 3C illustrate such structures. FIG. 3B shows a wear member or cushion 118*a* that has a top surface 117 with a plurality of teeth or projections 119, 121, and 122 and a plurality of curved-top protrusions 123. It is within the scope of this invention to enhance the screen-gripping ability of an item 118 with any combination and/or any number of the protrusions and/or projections shown in FIG. 3B. FIG. 3C shows a wear member or cushion 118*b* that has a top surface 125 with a plurality of grooves therein. The grooves 127 as shown extend from one side of the member 118*b* to the other; but it within the scope of this invention to sue a plurality of spaced-apart indentations or holes to enhance gripping ability. It is within the scope of this invention to enhance the screen-gripping ability of an item 118 with any combination and/or any number of the protrusions and/or projections shown in FIG. 3B.

FIG. 3C shows a clamping apparatus 120 according to the present invention which is like the apparatus 110, but which has a lower member 122 on a bladder 124. The lower member 122 has a toothed or roughened surface 126 for contacting screening material and/or for contacting part of a glue bead or glue strip on screening material. In certain aspects the lower member 122 is made of composite material, fiberglass, metal (e.g. but not limited to, stainless steel) or plastic and the roughened or toothed surface 126 is made of composite material, metal, fiberglass, or plastic. Any bladder disclosed herein may have any general configuration known in the art, including, but not limited to, those of U.S. patents (fully incorporated herein for all purposes) U.S. Pat. Nos. 3,968,033; 4,846,352; 5,226,546; 4,744,898; and of PCT Application PCT/SE93/003340.

Clamping down on a glue strip, rather than onto screening material alone, enhances the effects of clamping and inhibits or prevents tear propagation.

FIGS. 4A–4D show a shale shaker 130 according to the present invention which has a screen mounting basket 132 which is vibrated by vibrating apparatus 134. The basket 132 may be mounted for vibration with any suitable springs (not shown) on any suitable base or frame (not shown); including, but not limited to as in U.S. Pat. Nos. 6,401,935; 6,152,307; 5,221,008; and in the prior art cited in these patents.

A primary roll 136 of screening material 138 is rotatably mounted on one side of the basket 132 and a take-up roll 140 is mounted on the other side. The screening material 138 moves over or under an opening 142 of a bottom 144 of the basket 132.

The basket 132 may have any other or additional bottom openings as desired over which are mounted any desirable screening apparatuses or assemblies, e.g. as in typical known baskets. As shown a screening assembly 148 is mounted over a basket opening 146.

Figure 4A:
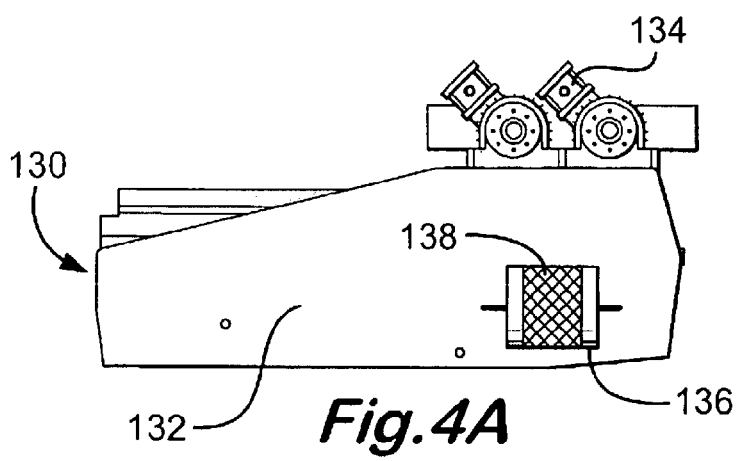
FIG. 4A is a side view of a shale shaker according to the present invention.
Figure 4B:
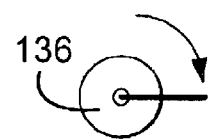
FIG. 4B is an end view of a roll of the shaker of FIG. 4A.
Figure 4C:
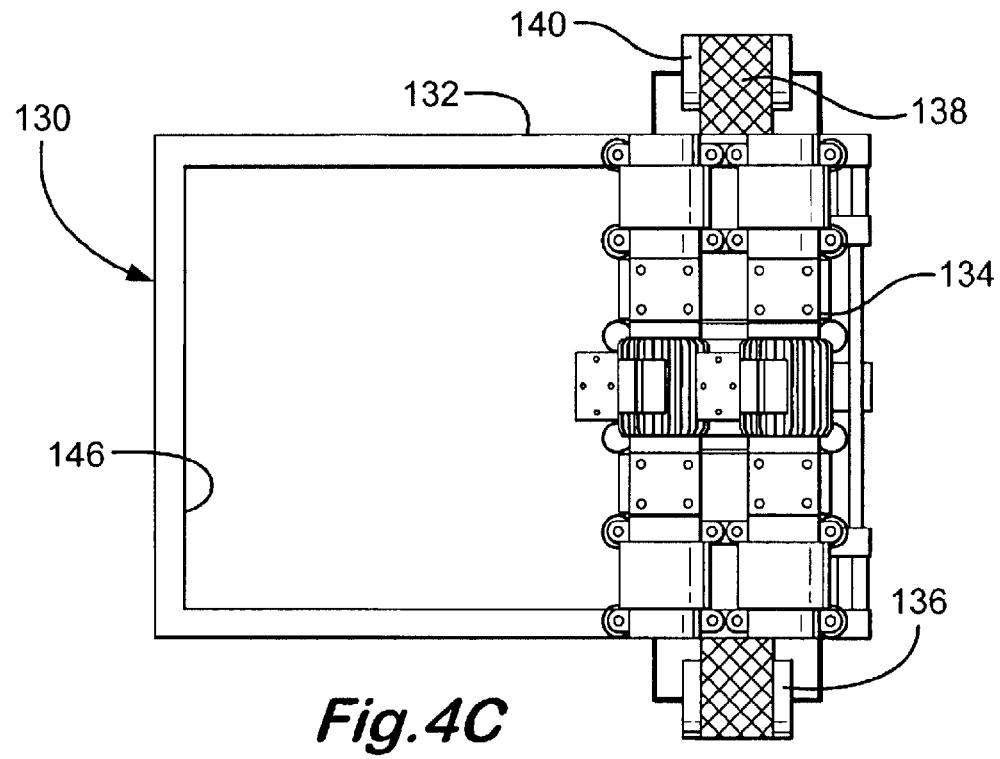
FIGS. 4C and 4D are top views of the shaker of FIG. 4A.
Figure 4D:
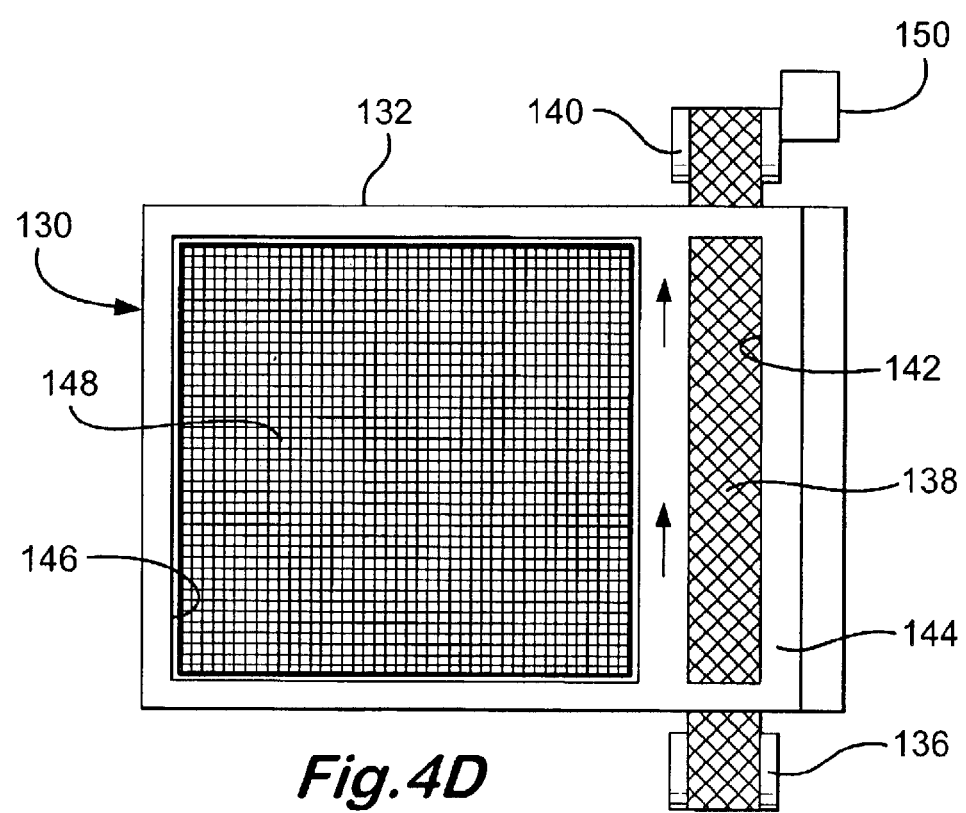

Power apparatus 150, shown schematically in FIG. 4D, has control apparatus and rotation apparatus for rotating the take-up roll 140 which in turn pulls the screening material 138 from the primary roll 136 (and rotates the primary roll 136). The power apparatus can be controlled to move new screening material into operable position as desired at preset intervals; to continuously or periodically move screening material as fluid is being processed; and/or to move screening material only when operated by personnel on site. It is also within the scope of this invention for screening material to be moved in the same direction as the movement of material moving off the screening material or in the reverse direction; e.g. from front to rear or from rear to front of a separator or shaker. It is within the scope of this invention for the opening 142 to be any desired size; for the opening 142 to cover substantially all the basket area with the opening 146 deleted; and/or for there to be a plurality of openings 142 and/or 146 (of the same or of different total area as viewed from above). It is also within the scope of this invention for the screening material to be in an endless loop around two space-apart rolls and for the rolls to be rotated continuously or periodically.

The present invention, therefore, in at least some, but not necessarily all embodiments, provides a shale shaker for treating drilling fluid having contaminants therein, the shale shaker including a base, a basket on the base, fluid introduction apparatus for introducing drilling fluid having contaminants into the basket, screen apparatus for selectively providing screening material in the basket, the screening material positioned so that the drilling fluid having contaminants flows onto the screening material, the screen apparatus having a primary roll of screening material, a take-up roll for receiving screening material from the primary roll, the primary roll and the take-up roll each rotatably mounted so that screening material is movable from the primary roll, through the basket, and onto the take-up roll, vibratory apparatus connected to the basket for vibrating the basket and the screening material so that contaminants on top of the screening material moves off the screening material, and receptacle apparatus for receiving fluid flowing through the screening material. Such a shaker may have one or some, in any possible combination, of the following: wherein the primary roll and the take-up roll are secured to the basket'; wherein the vibratory apparatus is connected to the basket for vibrating the basket and the screening material so that contaminants on top of the screening material move off the screening material; wherein the basket has a basket area for screening and the screening material of the screen apparatus has a screening area, the screening area less than the basket area; the basket has a basket area for screening and the screening material of the screen apparatus has a screening area, the screening area is substantially equal to the basket area; wherein the basket has a first bottom opening therethrough and the screening material is at said first bottom opening; wherein the basket has at least one second bottom opening and at least one screen assembly over said at least one second opening for treating drilling fluid; power apparatus for rotating at least one of the primary roll and take-up roll; clamping apparatus for holding the screening material in the basket; wherein the clamping apparatus comprising inflatable bladder apparatus for contacting and pressing against the screening material; the inflatable bladder apparatus having lower engagement surface for engaging the screening material; wherein the screening material has at least one glue strip and the lower engagement surface is positioned for contacting the at least one glue strip on the screening material; wherein the basket has a length between two ends and a width between two sides and the primary roll and take-up roll or on opposite sides of the basket; wherein the basket has a length between two ends and a width between two sides and the primary roll and take-up roll or on opposite ends of the basket; support apparatus connected to the basket and beneath the screening material for contacting and supporting the screening material; wherein the screening material has two spaced-apart opposed edges and the support apparatus is a strip of cushion material under each of the two spaced-apart opposed edges; wherein the screening material has two spaced-apart opposed edges and the support apparatus is a wear strip (which may or not serve also as a cushion) under each of the two spaced-apart opposed edges; wherein the support apparatus has a top surface and further has engagement apparatus and/or structure on the top surface of the support apparatus for engaging the screening material; and/or wherein the support apparatus is a plurality of support members spaced-apart beneath the screening material and in contact therewith.

The present invention, therefore, in at least some, but not necessarily all embodiments, provides a method for treating fluid and/or material, e.g. with a separator or with a shale shaker according to the present invention, the method including introducing fluid and/or material to be treated to the separator or shale shaker and using the separator or shaker to treat the fluid.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized. Any patent or patent application referred to herein is incorporated fully herein for all purposes.

What is claimed is:

1. A shale shaker for treating drilling fluid having contaminants therein, the shale shaker comprising
   a base,
   a basket on the base,
   fluid introduction apparatus for introducing drilling fluid having contaminants into the basket,
   a screen apparatus for selectively providing screening material in the basket, the screening material positioned so that the drilling fluid having contaminants flows onto the screening material,
   the screen apparatus comprising
      a primary roll of screening material,
      a take-up roll for receiving screening material from the primary roll,
      the primary roll and the take-up roll each rotatably mounted so that screening material is movable from the primary roll, through the basket, and onto the take-up roll,
      vibratory apparatus connected to the basket for vibrating the basket and the screening material so that contaminants on top of the screening material moves off the screening material, and
      receptacle apparatus for receiving fluid flowing through the screening material.

2. The shale shaker of claim 1 wherein the primary roll and the take-up roll are secured to the basket.

3. The shale shaker of claim 2 wherein the vibratory apparatus is connected to the basket for vibrating the basket and the screening material so that contaminants on top of the screening material move off the screening material.

4. The shale shaker of claim 1 wherein the basket has a basket area for screening and the screening material of the screen apparatus has a screening area, the screening area less than the basket area.

5. The shale shaker of claim 1 wherein the basket has a basket area for screening and the screening material of the screen apparatus has a screening area, the screening area is substantially equal to the basket area.

6. The shale shaker of claim 1 wherein the basket has a first bottom opening therethrough and the screening material is at said first bottom opening.

7. The shale shaker of claim 6 wherein the basket has at least one second bottom opening and at least one screen assembly over said at least one second opening for treating drilling fluid.

8. The shale shaker of claim 1 further comprising
   a power apparatus for rotating at least one of the primary roll and take-up roll.

9. The shale shaker of claim 1 further comprising
   a clamping apparatus for holding the screening material in the basket.

10. The shale shaker of claim 9 wherein the clamping apparatus comprising an inflatable bladder apparatus for contacting and pressing against the screening material.

11. The shale shaker of claim 10 further comprising
    the inflatable bladder apparatus having lower engagement surface for engaging the screening material.

12. The shale shaker of claim 11 wherein the screening material has at least one glue strip and the lower engagement surface is positioned for contacting the at least one glue strip on the screening material.

13. The shale shaker of claim 11 wherein the basket has a length between two ends and a width between two sides and the primary roll and take-up roll are on opposite sides of the basket.

14. The shale shaker of claim 11 wherein the basket has a length between two ends and a width between two sides and the primary roll and take-up roll are on opposite ends of the basket.

15. The shale shaker of claim 11 further comprising
    support apparatus connected to the basket and beneath the screening material for contacting and supporting the screening material.

16. The shale shaker of claim 15 wherein the screening material has two spaced-apart opposed edges and the support apparatus comprises
    a strip of cushion material under each of the two spaced-apart opposed edges.

17. The shale shaker of claim 15 wherein the screening material has two spaced-apart opposed edges and the support apparatus comprises
    a wear strip under each of the two spaced-apart opposed edges.

18. The shale shaker of claim 15 wherein the support apparatus has a top surface and further comprises
    engagement means on the top surface of the support apparatus for engaging the screening material.

19. The shale shaker of claim 15 wherein the support apparatus comprises a plurality of support members spaced-apart beneath the screening material and in contact therewith.

20. A method for treating fluid with a shale shaker, the method comprising
    introducing fluid to be treated to the shale shaker, the shale shaker comprising a base, a basket on the base, a fluid introduction apparatus for introducing drilling fluid having contaminants into the basket, a screen apparatus for selectively providing screening material in the basket, the screening material positioned so that the drilling fluid having contaminants flows onto the screening material, the screen apparatus comprising a primary roll of screening material, a take-up roll for receiving screening material from the primary roll, the primary roll and the take-up roll each rotatably mounted so that screening material is movable from the primary roll, through the basket, and onto the take-up roll, a vibratory apparatus connected to the basket for vibrating the basket and the screening material so that contaminants on top of the screening material moves off the screening material, and a receptacle apparatus for receiving fluid flowing through the screening material, and
    processing the fluid so that part of the fluid flows through the screening material into the receptacle.

* * * * *